United States Patent [19]

Tsuchiya

[11] 4,379,313
[45] Apr. 5, 1983

[54] TAPE CASSETTE LOADING DEVICE IN A MAGNETIC RECORDING AND/OR REPRODUCING APPARATUS

[75] Inventor: Eiichi Tsuchiya, Yokohama, Japan

[73] Assignee: Victor Company of Japan, Ltd., Yokohama, Japan

[21] Appl. No.: 180,577

[22] Filed: Aug. 25, 1980

[30] Foreign Application Priority Data

Aug. 23, 1979 [JP]  Japan ............................. 54-107578

[51] Int. Cl.³ ............................................ G11B 17/00
[52] U.S. Cl. ................................................... 360/96.5
[58] Field of Search ...................... 360/96.5, 96.1, 105, 360/137

[56] References Cited

U.S. PATENT DOCUMENTS

| | | | |
|---|---|---|---|
| 4,227,224 | 10/1980 | Umezawa | 360/96.5 |
| 4,227,226 | 11/1980 | Tashiro | 360/96.5 |
| 4,257,075 | 3/1981 | Wysocki | 360/96.5 |
| 4,320,424 | 3/1982 | Murayama | 360/96.5 |

FOREIGN PATENT DOCUMENTS 55-125570  9/1980  Japan ........................... 360/96.5

*Primary Examiner*—Robert M. Kilgore
*Attorney, Agent, or Firm*—Louis Bernat

[57] ABSTRACT

A tape cassette loading device in a magnetic recording and/or reproducing apparatus comprises a cassette holder movable up and down for receiving and holding a tape cassette, a driving source for operating in rotation in response to the detection of the partial insertion of the tape cassette in horizontal direction into the cassette holder, a drawing mechanism for drawing the partially inserted tape cassette into a predetermined position within the cassette holder by the transmitted rotational driving force from the driving source, and tape cassette loading mechanism for lowering the cassette holder with the tape cassette received and held therein by the driving force transmitted from the driving source when the tape cassette is drawn into a predetermined position in the cassette holder, and for loading the tape cassette to a predetermined loading position in the magnetic recording and/or reproducing apparatus.

7 Claims, 19 Drawing Figures

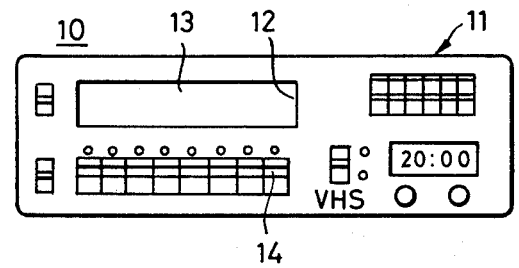
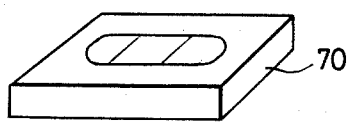
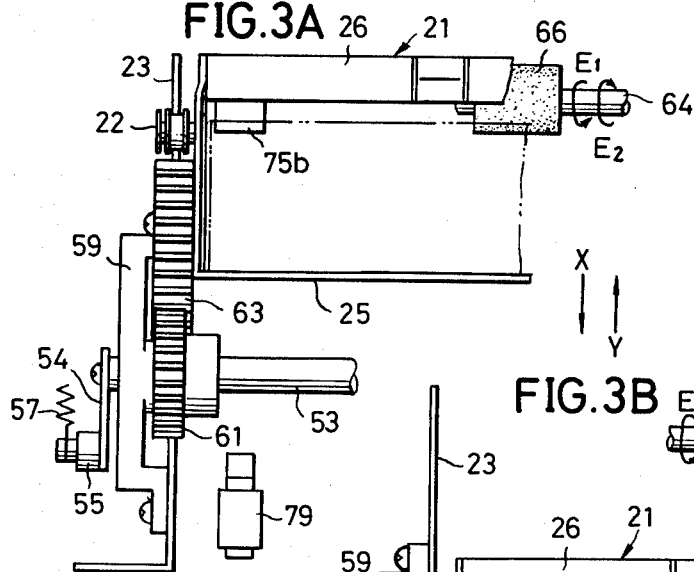
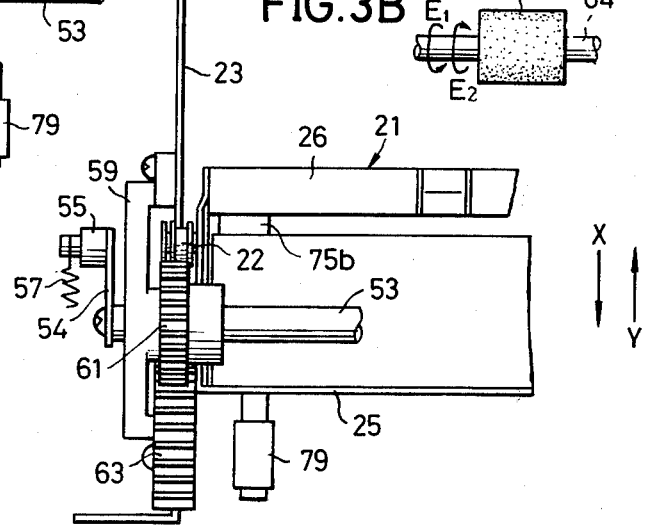

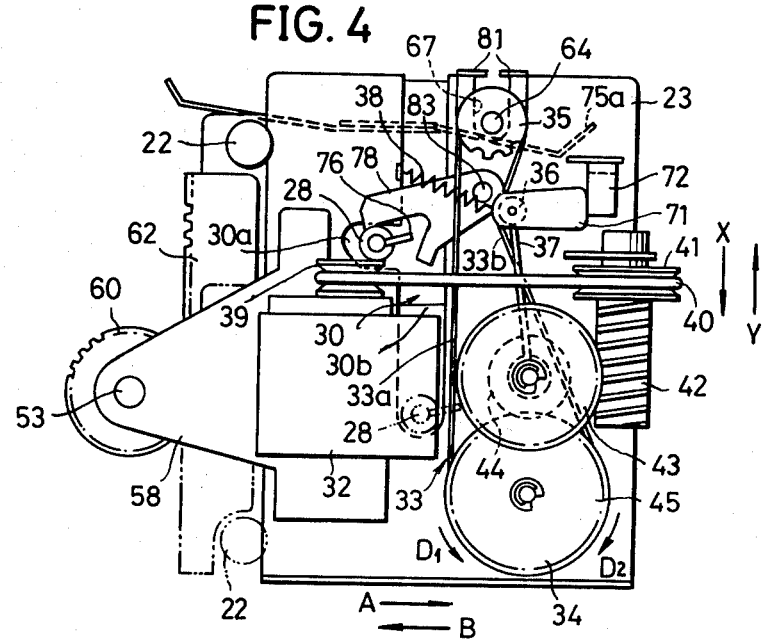
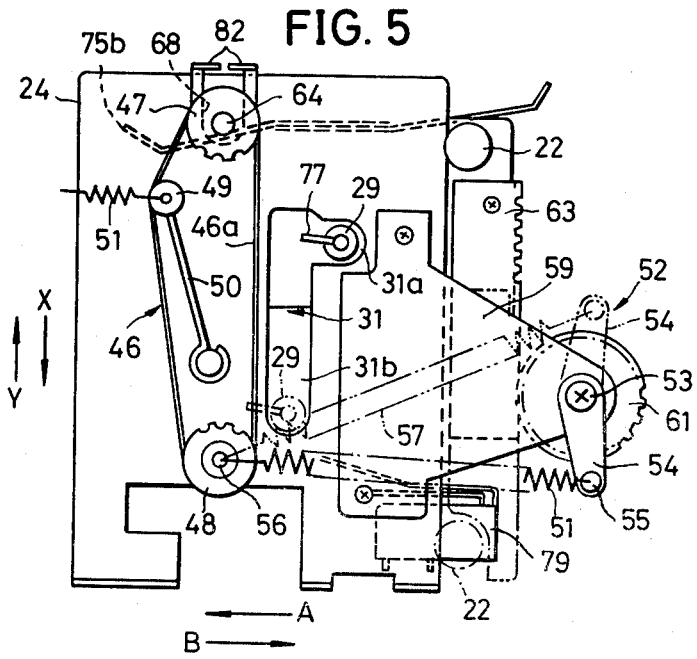

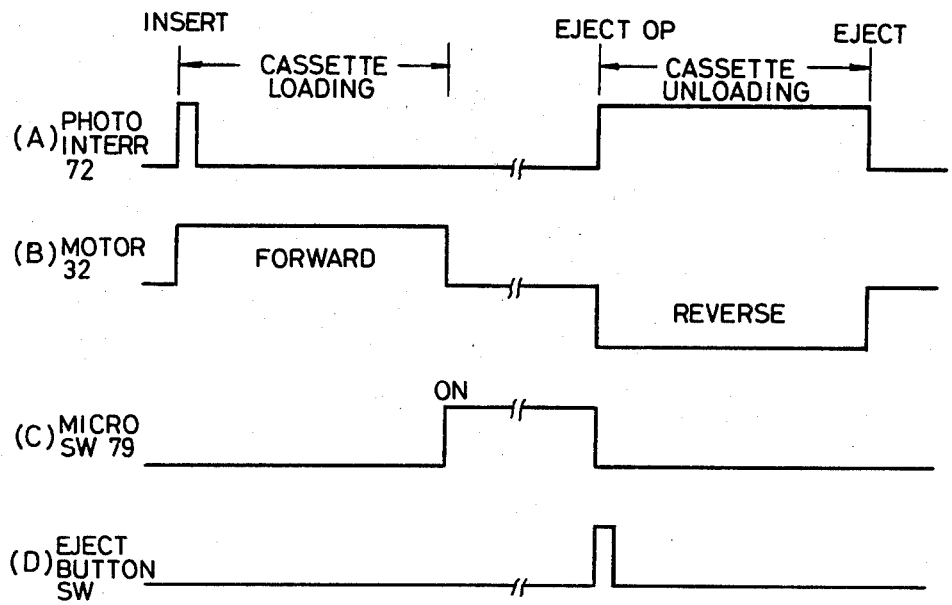
FIG. 6
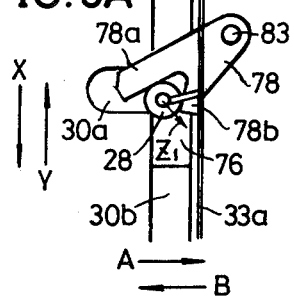
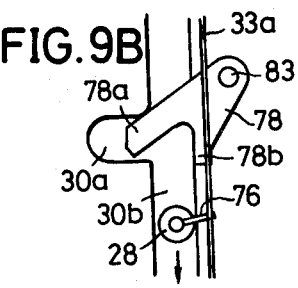
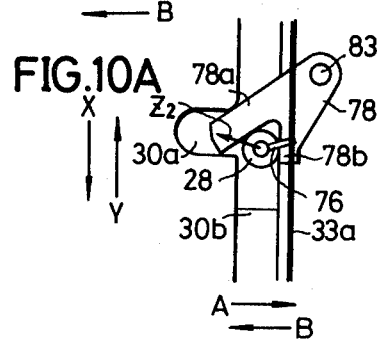
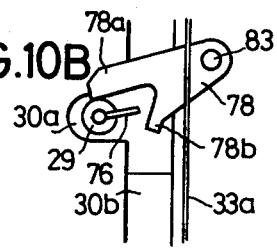

TAPE CASSETTE LOADING DEVICE IN A MAGNETIC RECORDING AND/OR REPRODUCING APPARATUS

BACKGROUND OF THE INVENTION

This invention relates generally to tape cassette loading devices in magnetic recording and/or reproducing apparatus, and more particularly to a tape cassette loading device applied to a magnetic recording and/or reproducing apparatus in which a tape cassette is inserted from a front opening of the apparatus and loaded into a predetermined loading position therein.

Conventionally, a tape cassette type magnetic recording and/or reproducing apparatus is constructed to contain a magnetic tape (hereinafter referred to as a tape cassette or simply as a cassette). In the specification and the appended claims of the present invention, a so-called tape cartridge is also included within the scope of the tape cassette. The cartridge or cassette is loaded into a predetermined position. Then, a magnetic tape (cassette tape) is automatically pulled out from within the cassette and guided along a predetermined tape travelling path passing the guide drum, by the automatic tape loading mechanism.

This known automatic tape loading mechanism, as shown in detail in the specifications of U.S. Pat. Nos. 4,060,840, 4,092,684, and 4,138,699 etc., for example, has a pair of tape pulling-out members at a predetermined position. In a magnetic recording/reproducing apparatus incorporating this automatic tape loading mechanism, a tape cassette of the construction shown in detail in U.S. Pat. No. 4,173,319, for example, is lowered to the predetermined loading position, from an upper position. During this lowering of the cassette, the above mentioned pair of tape pulling-out members are inserted into the inner side of the front tape within the tape cassette. The tape pulling-out members then move outside the cassette while engaging the tape, and move to the predetermined positions near both sides of a guide drum. Thus the tape is held by the tape pulling-out member and is pulled outside the cassette, and loaded onto a predetermined tape travelling path adjoining the peripheral area of the guide drum which has rotating magnetic heads.

The automatic tape loading mechanisms as well as the tape cassettes have been put into practical use in video tape recorders, and the construction of them are well known from the marketing of these manufactured goods in wide variety of countries.

As described above, in the automatic tape loading mechanism of a cassette type magnetic recording and/or reproducing apparatus, a pair of tape pulling-out members need to be inserted into the inner side of the tape, within the cassette. Thus, if the pair of tape pulling-out members are arranged to be raised and lowered, and are constructed to move upwards after the loading of the cassette, the mechanism becomes extremely complicated. Furthermore, the tape pulling-out members that move on both sides of the guide drum are also used as tape guiding members. Accordingly, the tape pulling-out members are required to have high positioning accuracy. But if the tape pulling-out members undergo both horizontal and vertical movements, the accuracy of the positioning of the tape pulling-out members deteriorates. Hence, it is not desirable to construct the pair of tape pulling-out members to undergo an up-and-down motion. For this reason, the cassette is lowered to the predetermined loading position from the upper position in this type of apparatus. The tape pulling-out member is inserted inside the cassette.

Therefore, in the conventional cassette loading device, a cassette holder, into which the cassette is inserted, is provided to be movable upwards and downwards on top of the casing of the magnetic recording and/or reproducing apparatus. Ordinarily, the cassette holder is pushed downwards, contracting a spring, and locking in a position in which the upper surface of the holder is in the same level as the top of the casing of the magnetic recording and/or reproducing apparatus. Upon a pressing of a cassette ejecting button, the cassette holder is released from the locked position, and by the force exerted by the contracted spring, the cassette holder moves upwards above the top of the casing revealing the cassette inserting opening. Then, the cassette is inserted in the opening of the cassette holder. The top of the cassette holder is pushed down by hand, contracting the spring and pushing the cassette holder downwards inside the casing so as to be in the same level as that of the top of the casing.

The cassette inserted in the cassette holder moves downward together with the cassette holder, and is loaded at a predetermined position. During this downward movement of the cassette, the above mentioned pair of tape pulling-out members are inserted inside the cassette and positioned on the inner side of the front tape. In addition, the front lid of the cassette is opened by the downward movement of the cassette.

Therefore, in the conventional cassette loading device, the cassette holder is constructed to undergo up-and-down movements on top of the casing of the magnetic recording and/or reproducing apparatus. As a result, articles could not be placed on top of the casing. The magnetic recording and/or reproducing apparatus could not be placed in space-limited positions because of the need for space above the top of the casing. Foreign articles could enter inside the cassette holder upon the raising of the cassette holder above the top of the casing. Furthermore it is inconvenient and troublesome to have to raise the cassette holder and push it down by hand.

SUMMARY OF THE INVENTION

Accordingly, it is a general object of the present invention to provide a novel and useful tape cassette loading device in a magnetic recording and/or reproducing apparatus in which the above described problems have been overcome.

More specifically, an object of the invention is to provide a tape cassette loading device in a magnetic recording and/or reproducing apparatus in which the cassette can be loaded into or unloaded from a predetermined position, from the front side of the casing of the magnetic recording and/or reproducing apparatus. The cassette loading device according to the present invention is constructed so that the cassette is inserted partially into the cassette holder from the opening provided on top of the casing of the magnetic recording and/or reproducing apparatus. The cassette is then automatically pulled into the cassette holder by the driving force exerted from the driving source, and furthermore, loaded with the cassette holder into a predetermined position. By the provision of this feature of the invention, the cassette holder does not project above the top of the casing of the magnetic recording and/or reproducing apparatus. Thus no restrictions are cast upon the space on top of the casing, there is no danger of foreign articles rolling inside the cassette holder from on top of the casing, and the loading operation of the cassette is facilitated.

Other objects and further features of the invention will be apparent from the following detailed description with respect to preferred embodiments of the invention when read in conjunction with the accompanying drawings.

BRIEF DESCRIPTION OF THE DRAWINGS

FIG. 1 is a front view showing one embodiment of the tape cassette loading device in a magnetic recording and/or reproducing apparatus according to the present invention;

FIG. 3A and FIG. 3B are front views showing, respectively, the states of one portion of the device of FIG. 2 before and after the loading of the cassette;

FIG. 4 and FIG. 5 are, respectively, right and left side views showing the device of FIG. 2;

FIG. 6(A) through FIG. 6(D) are, respectively, time charts for explaining the operations of the cassette detection, the motor rotation, and the like, of the device of FIG. 2;

FIGS. 9A and 9B, and FIGS. 10A and 10B are, respectively, views for explaining the movement of the studs shown in FIG. 4, upon the loading and unloading operations of the cassette.

DETAILED DESCRIPTION OF THE INVENTION

Referring to the attached drawings, in FIG. 1, the tape cassette loading device according to the present invention is applied to a magnetic recording and/or reproducing apparatus 10, which has a cassette inserting opening 12. The opening 12 is ordinarily covered by a rotatable cover 13.

Figure 2:
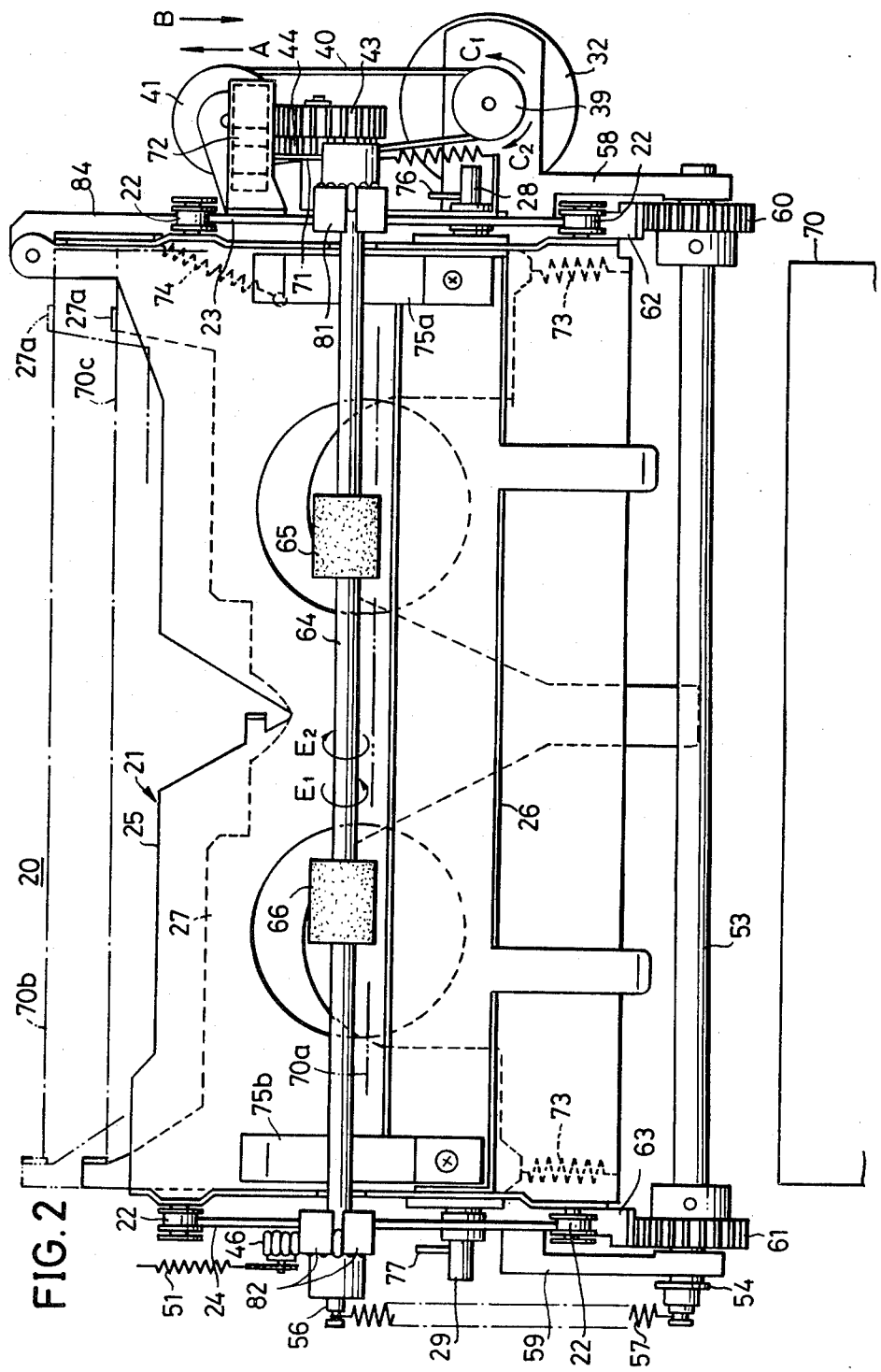
FIG. 2 is a plan view showing one embodiment of the present invention.

A tape cassette loading device 20 according to the present invention shown in FIG. 2, has a cassette holder 21 located in a opposing height position to the opening 12, when the cassette holder 21 is in the lifted state. Grooved rollers 22 provided on both sides at the front and rear of the cassette holder 21, are guided by engaging the perpendicularly standing edges of support plates 23 and 24. The cassette holder 21 is thus freely movable up-and-down along the support plates 23 and 24. The support plates 23 and 24 are fixed standing perpendicularly on the chassis inside a casing 11.

The cassette holder 21 comprises a cassette support plate 25 unitarily having a base plate part and side plate parts formed by perpendicularly bending both of its side edge, a transverse bridge member 26 fixed across the top edges of the side plate parts, and a space to insert the cassette therein. A sliding plate 27, which is slidable along the arrow directions A and B, is mounted on the bottom surface of the support plate 25. Studs 28 and 29 fixed on both sides of the sliding plate 27, are movably fitted in L-shaped slots 30 and 31 formed on the support plates 23 and 24. Engaging pins 76 and 77, which engage with chains as described hereinafter, are embedded along the radial direction obliquely above the studs 28 and 29.

A motor 32, a rotational speed reducing mechanism, a ladder chain 33, and the like are mounted on the exterior of the support plate 23. The chain 33, as clearly shown in FIG. 4, is hung across a large-diameter sprocket wheel 34 and a small sprocket wheel 35. A vertical span 33a on one side of the claim 33 is parallel to the perpendiculary extending portion of the slot 30. A tension pulley 36 is in contact with the other side of the chain 33 from the outside, to the other span 33b, and gives a tension to the chain 33. The tension pulley 36 is provided pivotally supported on the foremost end of a rod 37, and urged in the direction of arrow B by a spring 38. The insertion and ejection of the cassette are detected by the using the movements of the tension pulley 36, as will be explained later.

The mechanism for reducing the rotational speed of the motor comprises a pulley 39 provided on the rotational axis of the motor 32, a belt 40, a pulley 41, a worm 42, a worm wheel 43 which meshes with the worm 42, a small gear wheel 44 unitarily provided on the worm wheel 43, and a large gear wheel 45 which meshes with the small gear wheel 44.

A ladder chain 46, a toggle mechanism 52 and the like are mounted on the other support plate 24. The chain 46 is hung across sprocket wheels 47 and 48, receiving tension from a tension pulley 49. The tension pulley 49 is provided on the foremost end of a rod 50 of which other end is rotatably supported, and urged in the direction of arrow A by a spring 51. A vertical span 46a on one side of the chain 46 is parallel to the perpendicularly extending portion of the groove 31.

The toggle mechanism 52 comprises an arm 54 fixed on the end portion of a shaft 53, a pin 55 provided on the end of the arm 54, and a spring 57 provided between the pin 55 and a shaft 56 of the sprocket wheel 48. The shaft 53 is supported freely rotatable at both ends by support members 58 and 59 fixed on the support plates 23 and 24 and laterally supported. Gears 60 and 61 are provided unitarily rotatable at the proximity of both ends of the shaft 53. Racks 62 and 63 extending and fixed in the perpendicular direction from the support plates 23 and 24, mesh with gears 60 and 61.

Figure 7A:
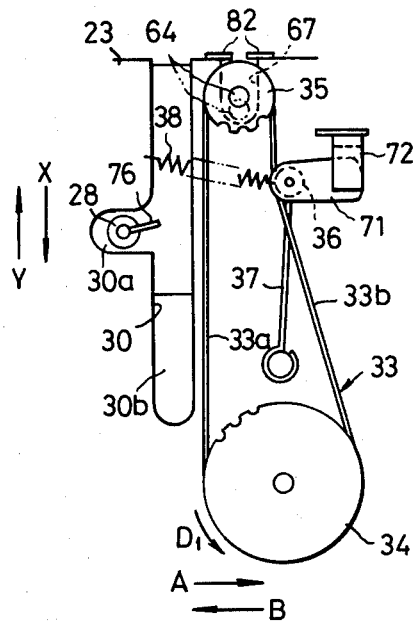
FIG. 7A through FIG. 7D are, respectively, portions of the part shown in FIG. 4, showing the states accompanied by the loading operation of the cassette.
Figure 7B:
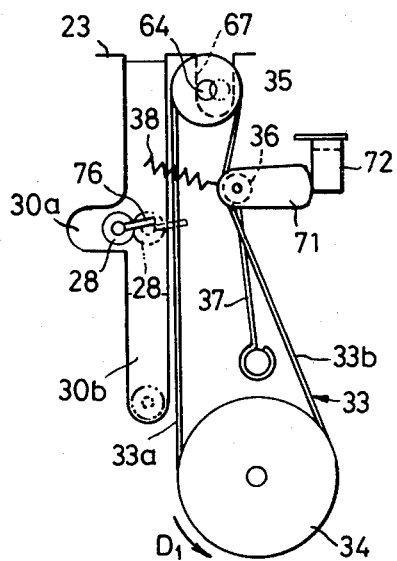
Figure 7C:
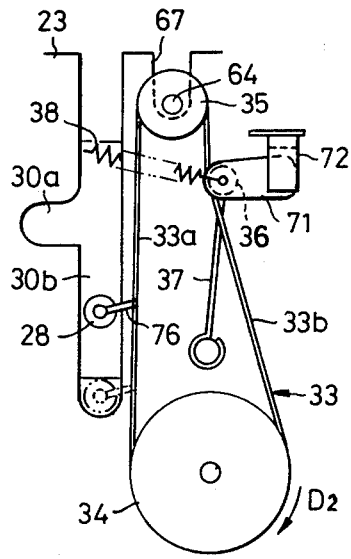
Figure 7D:
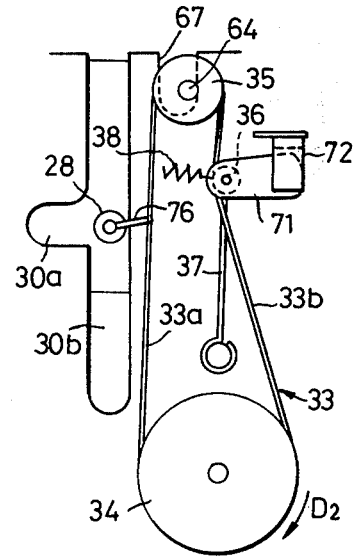
Figure 8A:
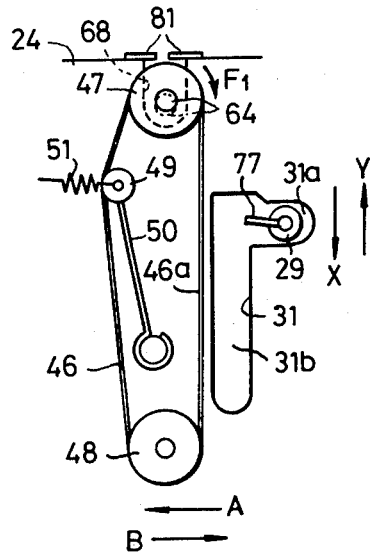
FIG. 8A through FIG. 8D are, respectively, portions of the part shown in FIG. 5, showing the states accompanied by the loading operation of the cassette.
Figure 8B:
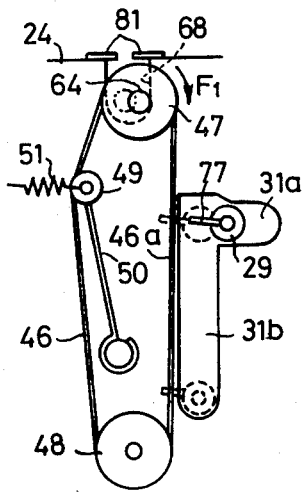
Figure 8C:
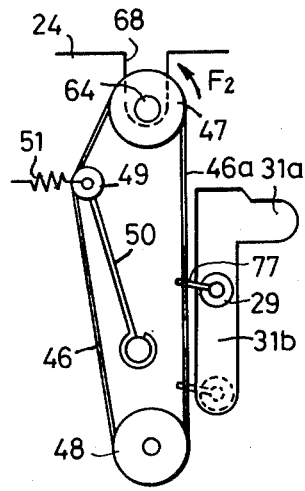
Figure 8D:
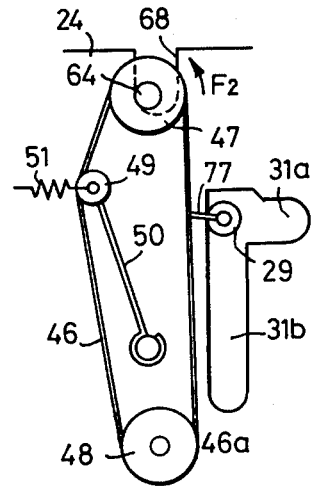

The sprocket wheels 35 and 47 are fixed on both ends of a shaft 64 which is laterally supported across above the support plates 23 and 24. A pair of rubber rollers 65 and 66 are provided on the shaft 64 approximately dividing the shaft into thirds. The proximity portions of both ends of the shaft 64 is inserted into U-shaped grooves 67 and 68 formed on the support plates 23 and 24, and the ends of the shaft 64 is supported in a state partially movable in up-and-down and left and right directions inside the grooves 67 and 68. And, by the movements of the shaft 64 inside the U-shaped grooves 67 and 68, the engagement and release of the pins 76, 77 with and from the chains 33 and 46, respectively, are performed smoothly along the direction of arrow A when loading the cassette (as shown in FIG. 7B and FIG. 8B) and along the direction of arrow B when unloading the cassette (as shown in FIG. 7D and FIG. 8D), and at the same time the insertion and ejection of the cassette is smoothly performed with ease.

The loading and unloading operation of the cassette will now be described in conjunction with FIG. 6. For loading of the cassette, a cassette 70 is inserted inside the cassette holder 21 in the direction of the arrow A, from the opening 12 of the casing 11, by pushing against and rotating the lid 13. In this instant, the cassette holder 21 is in a lifted state and is at the height position opposing to the opening 12.

When a portion of the cassette 70 is inserted into a position shown by a two-dot chain line 70a in FIG. 2, the top side of the front end of the cassette 70 pushes the bottom part of the rubber rollers 65 and 66 and raise them upwards. This pushing up of the rubber rollers 65 and 66 can be performed with ease by the slight inserting force exerted by the cassette 70. In accompaniment with the upward motion of the rubber rollers 65 and 66, the sprocket wheels 35 and 47 move upwards as well, whereby the chains 33 and 46 are tightened. Due to this motion, as shown in FIG. 7A, a shield plate 71 enters into a photo-interrupter 72 comprising a light source and a light receiving element, and a signal S1 is emitted from the photo-interrupter 72 as shown in FIG. 6(A).

The power-source circuit for the motor 32 is turned "ON" by this signal S1, and the motor 32 rotates in the arrow direction C1 (forward rotation direction) as indicated in FIG. 6(B). The rotation of the motor 32 is transmitted through the belt 40 to the worm 42 and further through the worm wheel 43 and gears 44 and 45, by which the rotational speed is reduced, and is then transmitted to the sprocket wheel 34, which thereby rotates in the arrow direction D1. As a consequence of the rotation of the sprocket wheel 34, the chains 33 and 46 travel in directions such that their vertical spans 33a and 46a move downward (arrow direction X). At the same time, as a consequence of the rotations of the sprocket wheels 35 and 47, and rubber rollers 65 and 66 rotate in the arrow direction E1. The above mentioned partially inserted cassette 70 is fed horizontally to its final position indicated by the single-dot chain line 70b into the cassette holder 21 in the arrow direction A by the rotation of the rubber rollers 65 and 66. Then, the shaft 64 moves in the arrow direction B and rotates in a position shown by a full line in FIGS. 7B and 8B.

By rotations of the sprocket 34 in the arrow direction D1, as shown in FIG. 7B, the span 33b of the chain 33 is slackened, whereby the shield plate 71 goes out the photo-interrupter 72. The signal S1 then disappears.

At the time, in this operation, when the cassette 70 is drawn into the position indicated by the single-dot chain line 70c, short of its final position, the front face of the cassette pushes the part 27a of the sliding plate 27, which thereafter slides in the arrow direction A together with the movement of the cassette, overcoming the force of springs 73.

An unlocking arm 84 is pivotally supported at its proximal end by the front end part of the support plate 25 and is urged to rotate in the clockwise direction as viewed in FIG. 2 by a spring 74. When the cassette 70 is drawn into its final position, the distal end of an arm 73 engages with a side wall of the cassette 70 and unlocks a locking mechanism for the lid of the cassette. Furthermore, the cassette 70 is pressed downward at opposite end parts of its upper face by leaf springs 75a and 75b, each fixed at its one end to the transverse bridge member 26, and is thereby inserted into and held by the cassette holder 21 without play.

Together with the sliding movement of the sliding plate 27, the pins 76 and 77 engage with the vertical spans 33a and 46a of the traveling chains 33 and 46 by moving in the arrow direction A within the horizontal slot parts 30a and 31b of the slots 30 and 31. This engagement of the pins 76 and 77 with the chains 33 and 46 is positively accomplished by a forked rotating plate 78 supported rotatably by a pin 83 on the support plate 23.

Thus, as shown in FIG. 9A and FIG. 9B, the stud 28 which moved in the arrow direction A pushes an arm part 78b of the rotating plate 78 to rotate it in a counterclockwise direction. By the rotation of the rotating plate 78, another arm part 78a pushes the stud 28 in the arrow direction Z1. As a result of this movement, the engagement of the pin 76 to the vertical span 332 of the chain 33 is performed positively, and the moving direction of the stud 28 is smoothly changed over from the arrow direction A to the arrow direction X.

Then, since the vertical spans 33a and 46a of the chains 33 and 46 are both traveling in the arrow direction X (downward), the sliding plate 27 and the cassette holder 21 are moved downward in the arrow direction X together with the pins 76 and 77 engaged with these parts 33a and 46a in concert with this downward travel thereof. During this operation, the cassette holder 21 moves downward as it is guided by the support plates 23 and 24 by way of the rollers 22, and the studs 28 and 29 move within the vertical slot parts 30b and 31b of the slots 30 and 31 and reach their positions indicated by two-dot chain lines in FIGS. 4 and 5.

The cassette holder 21, with the cassette 70 accommodated therein, descends to the predetermined loading position as shown in FIG. 3B. At this instant, the cassette holder 21 pushes a microswitch 79 fixed to the chassis side of the recording and reproducing apparatus and thereby turns this microswitch "ON" as indicated in FIG. 6(C). As a consequence of the switch 79 being turned "ON", the motor 32 stops. Since the worm 42 and the worm wheel 43 are intermeshed, they function as a sort of lock mechanism after the motor 32 stops rotating, and, by this action in concert also with the action of a toggle mechanism described hereinafter, the cassette holder 21 is positively held in its descended positions, whereby the cassette 70 is positively held in the loading position. When the cassette 70 is thus in this loading position, a spool drive shaft (not shown) on the side of the recording and reproducing apparatus is inserted into the shaft of the spool around which the magnetic tape is wound within the cassette 70.

Together with the descent of the cassette holder 21, the gears 60 and 61 are rotated respectively by the racks 62 and 63 in the clockwise direction as viewed in FIG. 4 and in the counterclockwise direction as viewed in FIG. 5, counter to the force of the spring 57. When the cassette holder 21 descends to the cassette loading position, the gears 60 and 61 rotate approximately 60 degrees in angle, and the arm 54 is directed in an obliquely upward direction as indicated by two-dot chain line in FIG. 5. The spring 57 this time imparts torque through the arm 54 to the gears 60 and 61 respectively in the same clockwise and counterclockwise directions as above. As a consequence, the cassette holder 21 is subjected to a downward force by the tension force of the spring 57 transmitted through the gears 60 and 61 and the racks 62 and 63 and is thereby positively held in the cassette loading position.

As mentioned above, the movement in the horizontal direction and the descending movement of the cassette 70 are carried out by only the rotation in the forward direction of the motor 32.

With the cassette 70 in the loaded state as described above, lid is open, and the operation of loading of the tape into the magnetic recording and/or reproducing apparatus is automatically carried out by a mechanism made known by disclosures such as those of the aforementioned United States patent, whereby recording and reproducing operations are carried out.

Next, the operation of separating the cassette 70 from the loading position and ejecting it to the outside will be described. This operation is carried out by a procedure which is substantially the reverse of that of the above described cassette loading operation.

When an EJECT button 14 shown in FIG. 1 is pressed, a switch (not shown) is turned "ON" as indicated in FIG. 6(D), whereby the motor 32 rotates (in reverse rotation) in the direction opposite that described above (i.e., in the arrow direction C2 in FIG. 2), the result of this switching being indicated in FIG. 6(B). This reverse rotation of the motor 32 is transmitted through the above mentioned speed-reduction mechanism to the large-diameter sprocket wheel 34, which thereupon rotates in the arrow direction D2. As a consequence of this rotation of the sprocket wheel 34, the chains 33 and 46 travel in directions such that their respective vertical spans 33a and 46a move in the arrow direction Y, and the rubber rollers 65 and 66 rotate in the arrow direction E2.

As a result of the travel of the chains 33 and 46, the cassette holder 21 is lifted in the arrow direction Y with the pins 76 and 77 in their state of engagement with the chains, and the cassette 70 is separated from its loading position. When the cassette holder 21 thus rises, the microswitch 79 is turned "OFF" as indicated in FIG. 6(C). Particularly in the case of the chain 33, its span contacted by the tension pulley 36 becomes the tensioned side as shown in FIGS. 7C and 7D, and the shield plate 71 is left in its state within the photo-interrupter 72. The output of the photo-interrupter 72 is thereby sustained at a high level until the cassette 70 is ejected, as indicated in FIG. 6(A).

When the cassette holder 21 rises together with the cassette 70, and the studs 28 and 29 reach positions where they partially engage the horizontal parts 30a and 31a of the slots 30 and 31, respectively, the upper surface of the cassette 70 contacts the rubber rollers 65 and 66 rotating in the arrow direction E2, whereby the cassette is conveyed in the arrow direction B (ejection direction). Furthermore, in accompaniment with the movement of the cassette 70 in the ejection direction, the sliding plate 27 is moved in the arrow direction B by the tensile force of the springs 73 at its two ends, and the studs 28 and 29 enter into the horizontal slot parts 30a and 31a and separate from the chains 33 and 46. In this connection, the disengagement of the pins 76 and 77 from the chains is carried out smoothly by the tension force of the spring 73, the movement in the arrow direction A of the chains 33 and 46 described hereinafter, and the action of the rotating plate 78 (see FIGS. 10A and 10B).

Thus, as shown in FIG. 10A and FIG. 10B, the stud 28 which moved in the arrow direction Y pushes the arm part 78a of the rotating plate 78 to rotate it in a clockwise direction. By the rotation of the rotating plate 78, another arm part 78b pushes the stud 28 in the arrow direction Z2. As a result of this movement, the pin 76 projects through the vertical span 33a of the chain 33, and the moving direction of the stud 28 is smoothly changed over from the arrow direction Y to the arrow direction B.

The cassette 70 is sent in the arrow direction B by the rotation of the rubber rollers 65 and 66, opens the cover 13 from the opening 12 of the casing of the magnetic recording and/or reproducing apparatus, and is ejected toward the outside. When the cassette 70 is sent to the position denoted by 70a in FIG. 2 and ejected, the rubber rollers 65 and 66 disengage from their contact state with the upper face of the cassette 70 and descend. As a consequence, the chains 33 and 46 slacken, and the shield plate 71 emerges out from the photo-interrupter 72. Accordingly, the output of the photo-interrupter 72 assumes a low level as indicated in FIG. 6(A), and the reverse rotation of the motor 32 stops as indicated in FIG. 6(B).

Thus, the separation of the cassette 70 from the loading position and its ejection to the outside is completed, and the apparatus assumes its original state as indicated in FIGS. 2, 3A, 4, and 5.

The rising movement and the movement in the horizontal direction of the cassette 70 are carried out as a result of only the reverse rotation of the motor 32.

Tongues 81 and 82 are provided, respectively, covering the top sides of the sprocket wheels 35 and 47, and preventing the overrun of the chains 33 and 46 from the sprocket wheels 35 and 47. Thus, the transmission between the chains 33 and 46 and the sprocket wheels 35 and 47 are performed positively.

The top sprocket wheel 34 of the chain 33 and the top sprocket wheel 47 of the chain 46 are, respectively, the driving sprocket wheels. Thus, upon loading of the cassette, as shown in FIG. 7A and FIG. 7B, the vertical span 33a of the chain 33 is under tension, and upon unloading of the cassette, as shown in FIG. 8C and FIG. 8D, the vertical span 46a of the chain 46 is under tension. Upon loading operation of the cassette, the pin 76 engages positively to the tensed vertical span 33a of the chain 33, and upon the unloading of the cassette, the pin 77 engages positively to the tensed vertical span 46a of the chain 46.

Most of the movable parts inside the device move in substantially the same speed, none of the parts moving in an accelerated manner, thus the loading and unloading of the cassette is performed quietly without producing impact sounds.

According to the embodiment of the present invention, the cassette is inserted into and ejected from the front side of the magnetic recording and/or reproducing apparatus, thus eliminating the above disadvantages of the conventional loading device. In addition, the magnetic recording and/or reproducing apparatus can be attached together with a television receiver set, and load and unload the cassette from the front side of the receiver set. Furthermore, a device which automatically selects and inserts a cassette out of a plurality of cassettes can be incorporated to the magnetic and/or reproducing apparatus.

Further, this invention is not limited to these embodiments but various variations and modifications may be made without departing from the scope of the invention.

What is claimed is:

1. A tape cassette loading device in a magnetic recording and/or reproducing apparatus comprising:
   a cassette holder means for holding a tape cassette therein, said cassette holder being movable vertically between a receiving position and a playing position, without a horizontal movement thereof;
   detection means for detecting a partial insertion of said tape cassette in a horizontal direction into said cassette holder;

a driving source means for operating in rotation in response to the detection of said partial cassette insertion by said detection means;

drawing means for drawing said partially inserted tape cassette into said cassette holder at said receiving position, said drawing means being driven by the rotational driving force transmitted from said driving source means; and tape cassette loading means for lowering said cassette holder to said playing position while holding said tape cassette therein, said lowering being responsive to the driving force transmitted from said driving source means after said tape cassette is drawn into said cassette holder assuming said receiving position.

2. A tape cassette loading device as claimed in claim 1 in which said drawing means comprises roller means for contacting the top side of said partially inserted tape cassette, rotating by the driving rotational force transmitted from said driving source, and drawing said tape cassette into said cassette holder in accompaniment with its rotation.

3. A tape cassette loading device as claimed in claim 2 in which said roller means comprises a rotating shaft extending in a perpendicularly intersecting direction to the insertion direction of said tape cassette into said cassette holder, and a roller or rollers for unitarily rotating with said rotating shaft, said rotating shaft and rollers being lifted up by being pushed by the top side of said partially inserted tape cassette, and which further comprises an endless member of closed loop travelling by the rotational driving force from said driving source and transmitting the driving force to said rotating shaft, said closed loop endless member being deformed by the lifting of said rotating shaft, and said detection means being constructed by emitting a signal to operate said driving source in accordance with a deformation of said closed loop endless member.

4. A tape cassette loading device as claimed in claim 3 in which said tape cassette loading means comprises engaging means which undergoes displacement in accordance with the drawing of said tape cassette into said cassette holder and engages with said endless member upon insertion of said tape cassette to said receiving position, and lowers said cassette holder unitarily with and by said endless member.

5. A tape cassette loading device as claimed in claim 1 which further comprises means for detecting the lowering of said cassette holder to said playing position and stopping the operation of said driving source.

6. A tape cassette loading device as claimed in claim 1 which further comprises means for applying a force upon said cassette holder to positively maintain said cassette holder at said playing position.

7. A tape cassette loading device as claimed in claim 4 which further comprises switching means for ejecting said tape cassette from said cassette holder, said driving source rotating in the reverse direction upon operation of said switching means for the ejection, said tape cassette loading means lifting said cassette holder to said receiving position responsive to a rotational driving force transmitted from said driving source means while rotating in the reverse direction; and means for releasing the engagement of said engaging means to said endless member upon the lifting of said cassette holder up to said receiving position.

* * * * *